United States Patent [19]

Ide et al.

[11] Patent Number: 5,038,460
[45] Date of Patent: Aug. 13, 1991

[54] METHODS OF MANUFACTURING STATOR HOUSING AND ROTOR FOR MINIATURE MOTOR

[75] Inventors: Minoru Ide; Kazuhiko Kannan, both of Kanagawa, Japan

[73] Assignee: Fuji Electric Co., Ltd., Kanagawa, Japan

[21] Appl. No.: 417,893

[22] Filed: Oct. 6, 1989

Related U.S. Application Data

[60] Division of Ser. No. 344,440, Apr. 27, 1989, abandoned, which is a continuation of Ser. No. 110,343, Oct. 20, 1987, abandoned.

[30] Foreign Application Priority Data

Oct. 23, 1986 [JP] Japan ................................ 61-252256
Oct. 23, 1986 [JP] Japan ................................ 61-252257

[51] Int. Cl.⁵ ............................................ H02K 15/14
[52] U.S. Cl. .................................... 29/596; 264/272.2; 310/43; 310/90
[58] Field of Search ..................... 29/596, 598; 310/43, 310/42, 258, 268, 156, 40 MM, 67, 90; 264/272.2, 272.14

[56] References Cited

U.S. PATENT DOCUMENTS

| 4,617,484 | 10/1986 | Buijsen | 310/67 R X |
| 4,672,250 | 6/1987 | Seitz | 310/90 |
| 4,682,065 | 7/1987 | English et al. | 310/90 |
| 4,835,840 | 6/1989 | Stokes | 29/598 |
| 4,862,582 | 9/1989 | Hencke | 29/596 |

Primary Examiner—Carl E. Hall
Attorney, Agent, or Firm—Finnegan, Henderson, Farabow, Garrett and Dunner

[57] ABSTRACT

In a miniature motor, a rotor being constructed by installing a magnet facing the outer peripheral face of a stator on the inner peripheral face side of a ringlike yoke made of magnetic material and coupled to a rotary shaft, is characterized in that said rotor is supported with a resin-molded discoidal spider incorporating said rotary shaft and said ringlike yoke. A stator housing for a miniature motor for being loaded with a stator to cover the side faces of said stator, equipped with a magnetic shielding plate on its face opposite to said stator and provided with a bearing assembly for supporting a rotor shaft on the inner peripheral side of a boss part in the center of said housing, is characterized in that said stator housing is constructed by molding resin into said housing to incorporate said magnetic shielding plate and said bearing assembly.

1 Claim, 5 Drawing Sheets

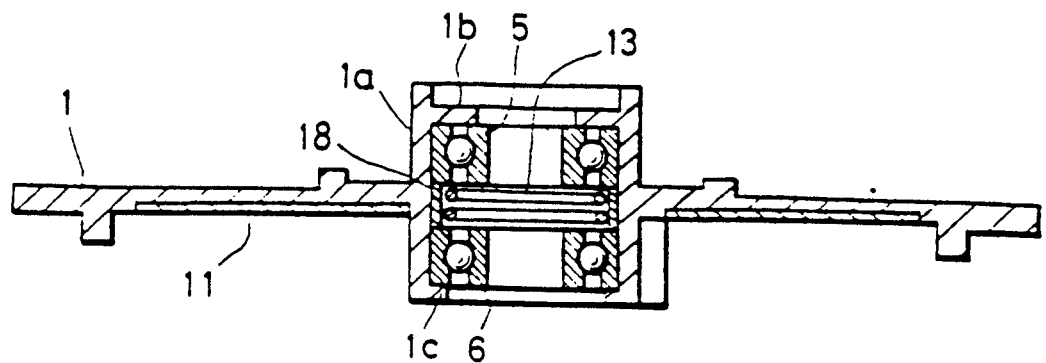
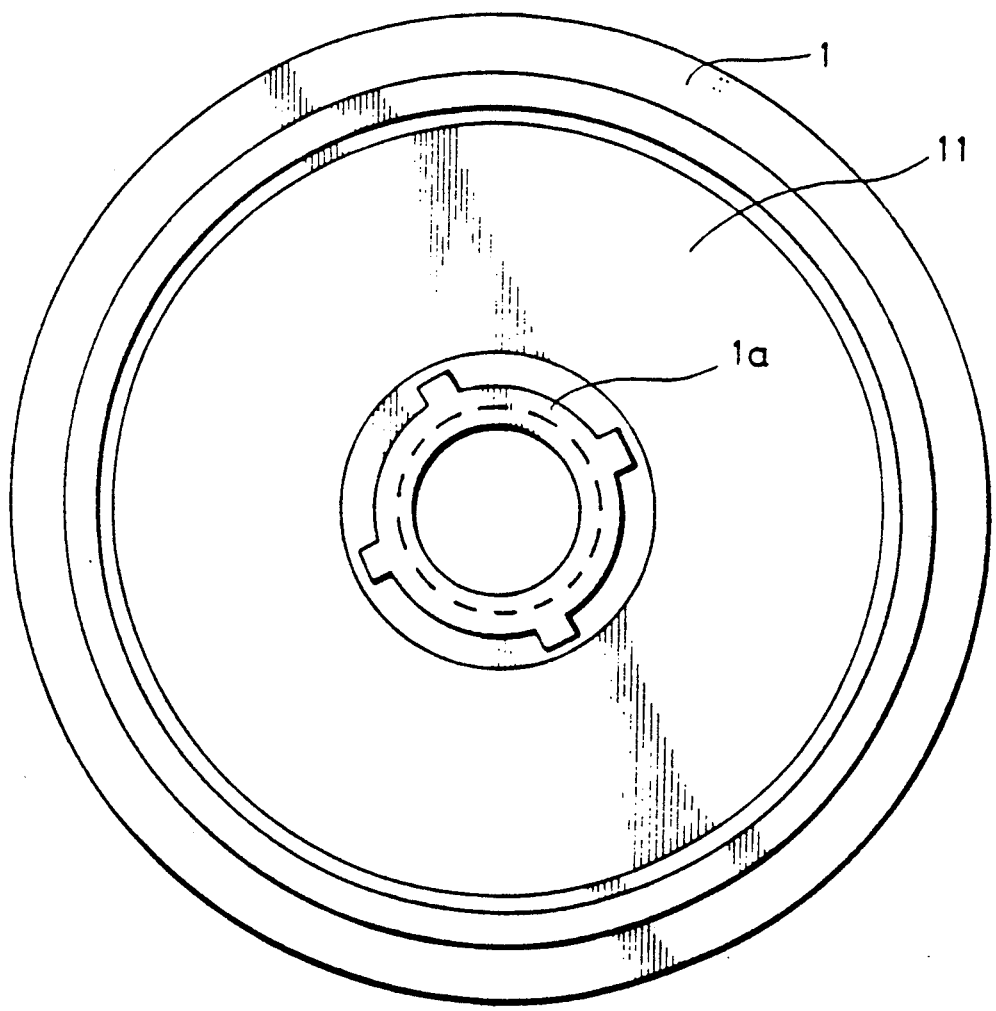

METHODS OF MANUFACTURING STATOR HOUSING AND ROTOR FOR MINIATURE MOTOR

This is a division of application Ser. No. 344,440, filed Apr. 27, 1989 now abandoned, which was a continuation of prior application Ser. No. 110,343, filed Oct. 20, 1987, now abandoned.

BACKGROUND OF THE INVENTION

1. Field of the Invention

The present invention relates to a miniature motor designed for use as a driving motor in a fixed magnetic disk unit for office automation equipment and more particularly to the construction of a stator housing and a rotor of the miniature motor.

2. Prior Art

Miniature DC brushless motors are generally employed as driving motors for fixed magnetic disk units, and the construction of a conventional DC brushless motor is shown in FIG. 1. As shown in FIG. 1, a stator housing 1 of a motor is simultaneously used as a frame for mounting the motor and a stator 2 is fitted to the outer periphery of a boss part of the stator housing 1, the stator 2 being formed by winding an armature winding 4 on a stator core 3. On the other hand, a rotor comprises a rotary shaft 7 supported at two places via bearings 5, 6 axially fitted in a row onto the inner peripheral side of a central boss part 1a in the stator housing 1; a dished rotor yoke 8 of magnetic material connected to one end of the rotary shaft 7; and a magnet 9 installed opposite to the outer peripheral face of the stator 2 on the inner peripheral face of an outer peripheral rim part 8a of the rotor yoke 8. Moreover, a hub 10 for being loaded with a magnetic disk (not shown) is installed at the other end of the rotary shaft 7 which is passed through the stator housing 1. A magnetic shielding plate 11 for magnetically shielding the magnetic disk is attached face-to-face with one side of the stator housing 1 and an electric circuit required on the part of the stator is formed with the magnetic shielding plate 11 as a circuit board. Further, as shown in FIG. 1 a grounding ball 12 in contact with a chassis (not shown) is fixed into the end surface of the rotary shaft 7 and a compression coil spring 13 is held between the outer race of the radial ball bearing 6 and the stator housing 1. The compression coil spring 13 is responsible for holding the bearing 6 stable and displaceable during axial expansion and contraction of the rotor shaft due to temperature changes.

Referring to FIG. 2, the stator housing 1 of the aforesaid motor will be described further in detail. The stator housing 1 made of diecast aluminum has the magnetic shielding plate 11 bonded thereto with an adhesive agent. The stator 2 (not shown) is fitted to the outer periphery of the boss part 1a and the bearing 5 is fitted into the opening at the stator housing's one end on the inner peripheral side of the boss part 1a, whereas the bearing 6 and the coil spring 13 are fitted into the stator housing's opening from the other end. Then a stop ring 14 is used to fix the connection between the bearing 5 and the rotary shaft 7 when the rotary shaft 7 is inserted as shown in FIG. 1, completing the assembly. The outer race of the bearing 6 is supported across the stator housing 1 in such a manner as to be stopped from turning via a slide key, spline or the like.

Referring to FIG. 3, the construction of the rotor will be described further in detail. The dished rotary yoke 8 including the ringlike rim part 8a and a discoidal spider part 8b is first made by cutting or forging steel. The magnet 9 is installed on the inner peripheral side of the rim part 8a thereof. The combination of the rotary yoke 8 and the magnet 9 is then coupled to the rotary shaft 7 with an adhesive agent to form the rotor.

As set forth above, the stator housing 1 is made of diecast aluminum, and consequently a shrinkage void resulting from swallowing up air during the aluminum diecasting process tends to be produced in the layer thereof. Although the shrinkage void thus produced in the layer of the housing does not particularly affect its mechanical strength, the air is allowed to leak from the motor through the shrinkage void to the magnetic disk and dust penetrating in company with the air leakage from the outside may stick to the magnetic disk. Moreover, the diecast product cannot be subjected to accurate machining and needs more accurate finish machining for bearings and the like to be incorporated. In addition, a number of man-days are required to incorporate the magnetic shielding plate 11, the bearings 5, 6, etc. into the housing 1 thereby contributing to boosting motor production costs.

The aforesaid metal rotor is disadvantageous in that, because it is heavy and has the inertia moment increasing, greater starting torque essential to a driving motor for a fixed magnetic disk unit in particular is hardly unavoidable. In addition, the generation of noise is increased as the motor is operated. The disadvantages further include high production costs resulting from a number of man-days required for manufacturing, and assembling parts, including coupling the rotary shaft to the stator housing, into the rotor yoke.

SUMMARY OF THE INVENTION

The present invention is intended to solve the aforesaid problems and it is therefore an object of the invention to provide a miniature motor in which the stator housing is made of plastics to reduce the weight of a stator housing and to simultaneously solve such problems as those posed by shrinkage voids often produced in the conventional housing structure and those concerning the assembly of parts including a magnetic shield and bearings.

It is another object of the invention to provide a miniature motor in which part of a rotor structure is made of plastics to reduce the weight thereof thereby to solve such problems as those derived from starting torque and noise, and those concerning the manufacture and assembly of parts.

In order to solve the aforesaid problems, according to the present invention, the stator housing for use in a miniature motor, which housing is loaded with a stator to cover the side faces thereof, equipped with a magnetic shielding plate on its face opposite to the stator, and provided with a bearing assembly for supporting a rotary shaft on the inner peripheral side of a boss part in the center of the housing, is constructed by molding resin into the housing body to incorporate the magnetic shielding plate and the bearing assembly.

Also, in order to solve the aforesaid problems, according to the present invention, the rotor for a miniature motor, wherein a magnet facing the outer peripheral face of the stator is installed on the inner peripheral side of a ringlike yoke made of magnetic material and coupled to the rotary shaft, is supported with a resin-molded discoidal spider incorporating the rotary shaft and the ringlike yoke.

With the aforesaid arrangement, the resin-molded stator housing becomes light in weight, together with the effect of inhibiting such shrinkage voids from appearing as in the case of a conventional diecast, and is thus made free from air leakage through the cavity which has heretofore posed a serious problem. Moreover, such troublesome assembly work as was the case with the conventional housing structure can be dispensed with by integrally molding resin into the housing incorporating the magnetic shielding plate and the bearing assembly and therefore the number of man-days can also be decreased.

Also, with the aforesaid arrangement, since resin which is lighter than metal material is molded into the spider incorporating the rotary shaft and the magnet, the weight of the rotor is reduced, together with the effect of not only improving motor starting characteristics but also reducing noise accompanied by rotation with the aid of the vibration damping effect common to resin. When the spider is prepared, the rotary shaft and the ringlike yoke are inserted into a mold cavity and then molding resin is injected into the cavity, so that the rotor and the ringlike yoke are integrally coupled to form the spider through one and the same molding process.

BRIEF DESCRIPTION OF THE DRAWINGS

FIG. 4 is a sectional view showing the construction of a stator housing embodying the present invention;

FIG. 5 is a bottom view of FIG. 4;

DETAILED DESCRIPTION OF THE PREFERRED EMBRODIMENTS

Figure 1:
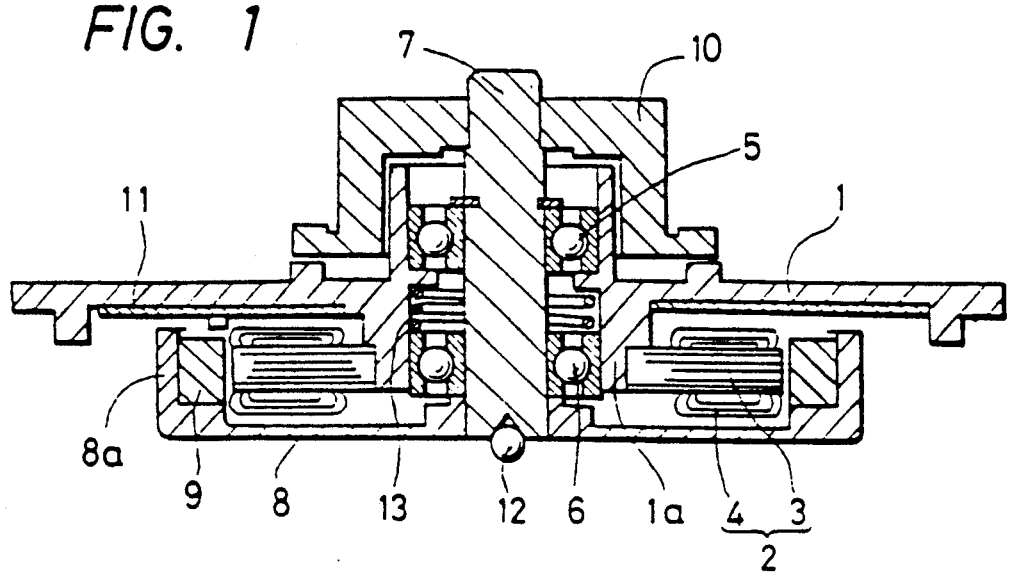
FIG. 1 is a sectional view showing the construction of a conventional DC brushless motor.
Figure 2:
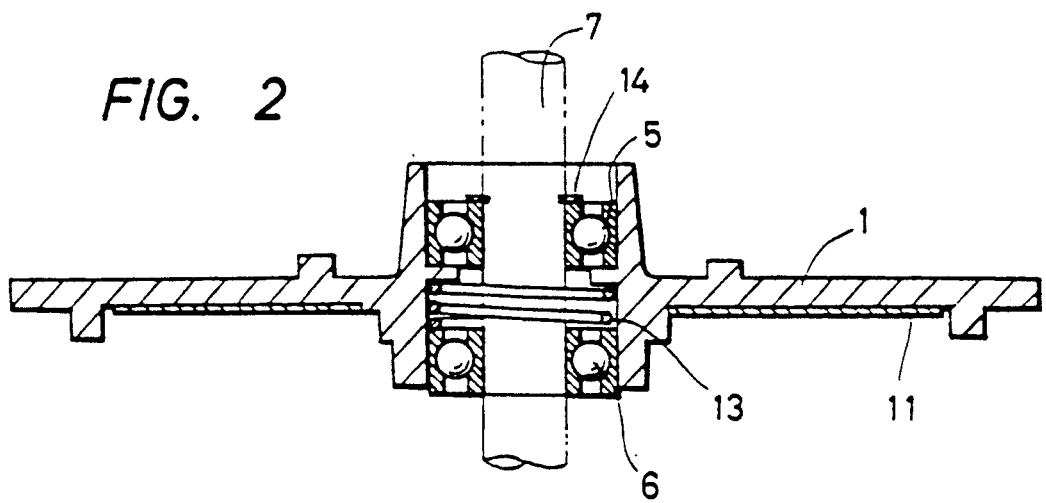
FIG. 2 is a sectional view of the stator housing in FIG. 1.

One embodiment of the present invention will be described with reference to FIGS. 4 through 7. In the drawings, like reference characters designate like parts, corresponding to those shown in FIGS. 1-3. In FIGS. 4 and 5, resin is molded into a stator housing 1 incorporating a magnetic shielding plate 11 on the plate face on the stator side, whereas a bearing assembly including a combination of bearings 5, 6 and a coil spring 13 is integrally molded on the inner peripheral side of a central boss part 1a. In this case, the outer races of the bearings 5, 6, together with a coil spring 13 are held between flanges 1b and 1c against the inner peripheral side of a boss part 1a. The outer races are held axially slidable, being stopped via a sliding key, spline or the like. The flanges 1b and 1c protrude radially inward.

Figure 6:
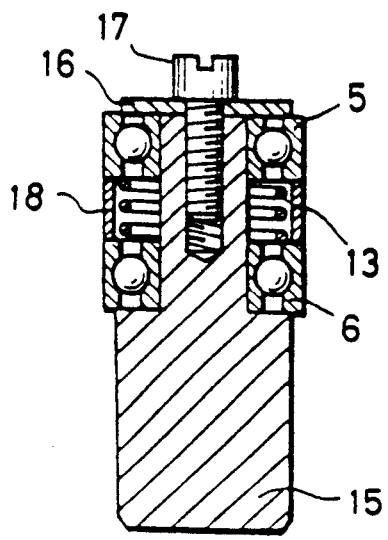
FIG. 6 is a diagram showing a tentative bearing assembly installed on an insert pin.

The method of manufacturing the stator housing 1 thus constructed will now be described in detail. Before resin is molded into the housing 1, the bearings 5, 6 and the coil spring 13, arranged as shown in FIG. 6, are fitted onto an insert pin 15 axially and fastened via a cap plate 16 with a bolt 17 to tentatively assemble the combination. The open end face between the outer and inner races of the bearing 5 is blocked up with the cap plate 16, whereas the open end face of the bearing 6 is blocked up with the step part of the insert pin 15. The outer peripheral face of the coil spring 13 is sealed with a cover 18 made of flexible material such as silicone or rubber. Although the cover 18 is to be left as it is in the boss of the stator housing 1, as shown in FIG. 4, its flexibility will never impair the function of the coil spring 13.

Figure 7:
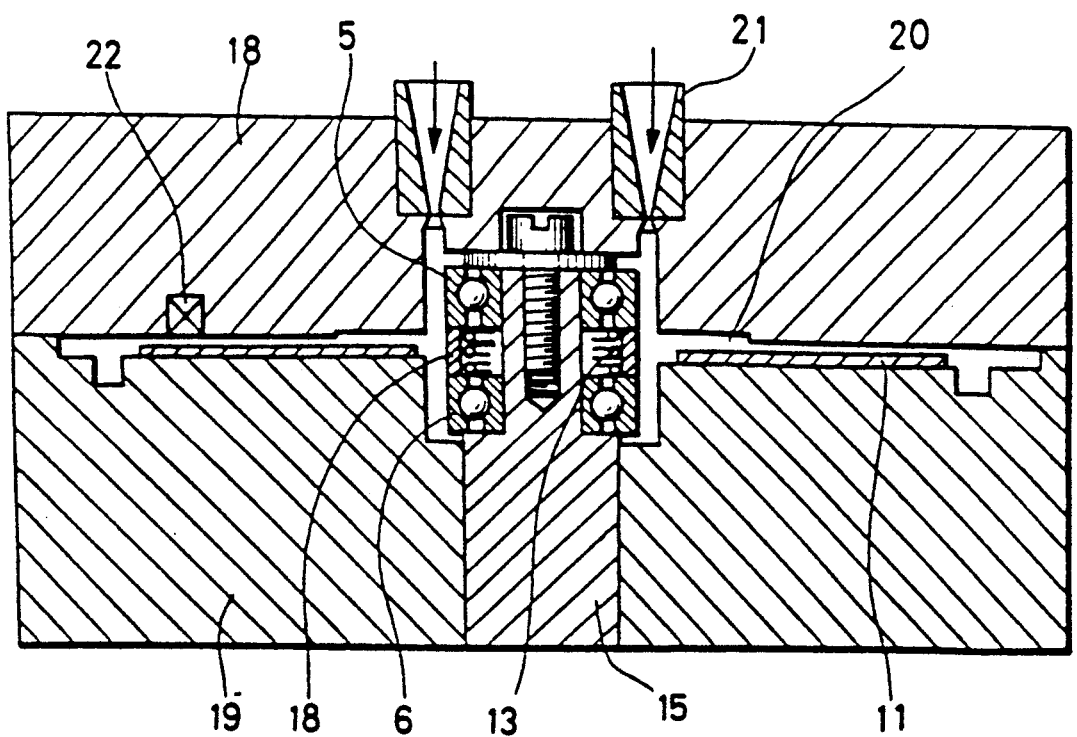
FIG. 7 is a sectional view showing a resin mold in such a state that each part has been inserted therein.
Figure 8:
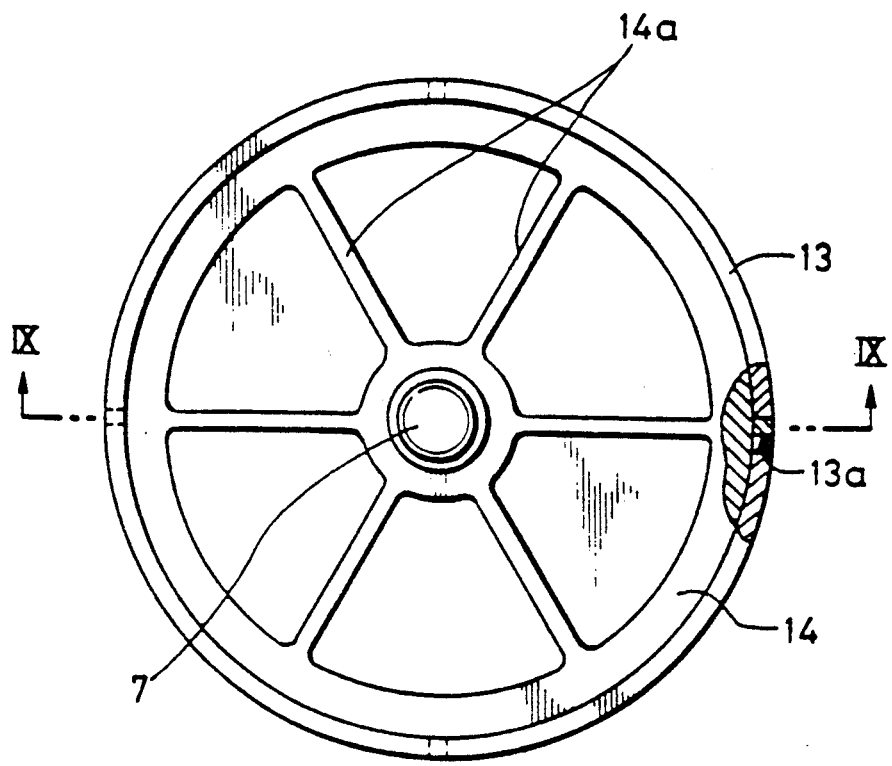
FIGS. 8 and 10 are top views showing the construction of another embodiment of the present invention, respectively.
Figure 9:
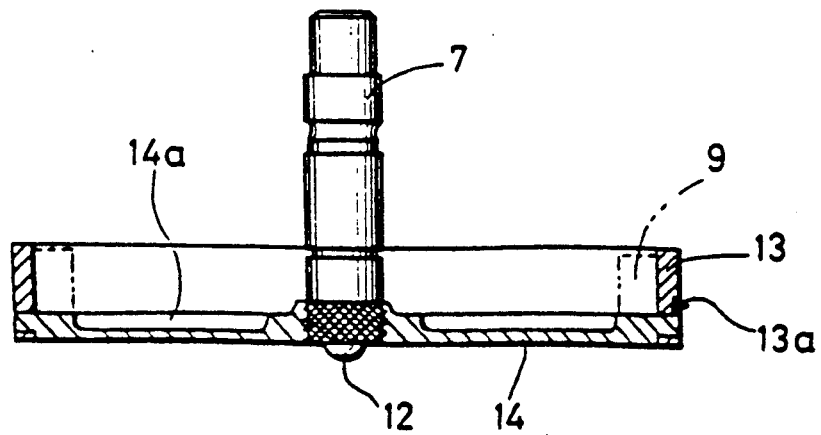
FIGS. 9 and 11 are sectional views taken on lines IX—IX and XI—XI of FIGS. 8 and 10, respectively.

As shown in FIG. 7, the bearing assembly together with the insert pin 15 are inserted in the center of the interior of the cavity 21 of an injection mold consisting of an upper die 19 and a lower die 20. A magnetic shielding plate 11 is inserted into a fixed position on the cavity bottom of the lower die 20. The peripheral face of each of the bearings 5, 6 of the bearing assembly is coated with a die lubricant and the magnetic shielding plate 11 is kept absorbed in a predetermined insert position by a magnet (not shown) installed in the mold. Subsequently, the interior of the cavity is evacuated to reduce the pressure therein up to about 1 Torr and injection molding resin is injected into the cavity 21 through a gate 22 provided in the upper die 19. Injection molding is thus started. As shown in FIG. 7, a pressure sensor 23 is used to detect the internal pressure of the cavity. While the resin is being injected, the open end faces of bearings 5, 6 and, with the bearing assembly being tentatively assembled as described in reference to FIG. 6, the periphery of the coil spring 13 are kept closed. Consequently, no injection molding resin is allowed to enter the bearings. With the aforesaid resin molding operation, the stator housing 1 incorporating the magnetic shielding plate 11 and the bearing assembly is integrally molded as shown in FIGS. 4 and 5.

Figure 10:
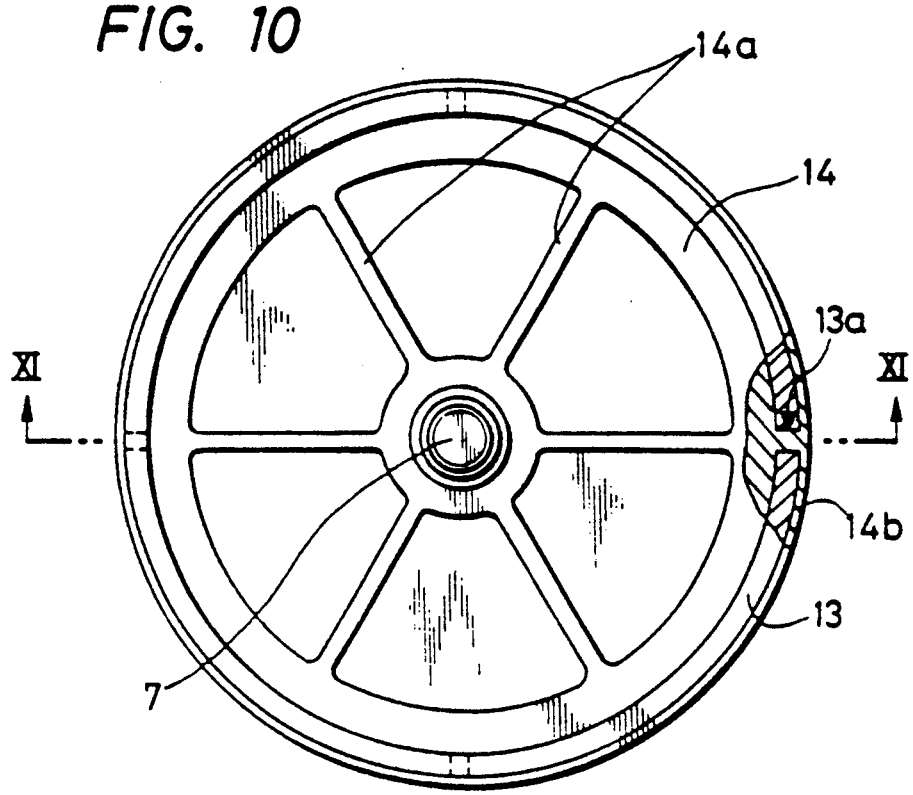
Figure 11:
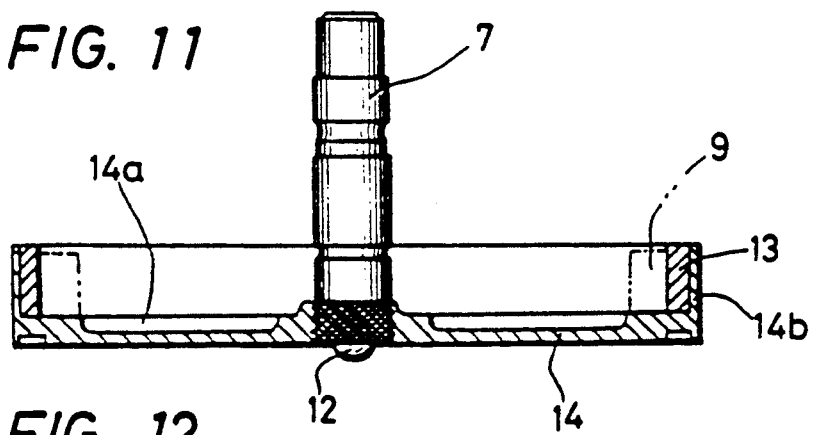
Figure 12:
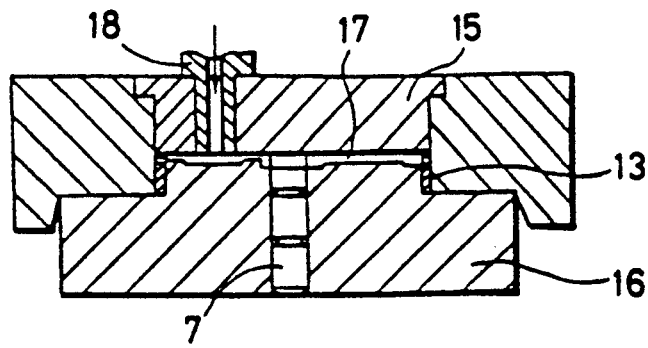
FIG. 12 is a sectional view of a resin mold.

FIGS. 8 and 9 and FIG. 10 and 11, respectively show different embodiments of the present invention, whereas FIG. 12 shows a mold for molding resin. In the embodiment shown in FIGS. 8 and 9, the rotary shaft 7 and a ringlike rim part 8a of rotary yoke 8 made of magnetic material and used as a magnetic part of the magnet 9 are integrally coupled by resin molded into a discoidal spider part 8b in between them. To provide the discoidal spider part 8b, the rotary shaft 7 and the ringlike rim part 8a are inserted in a predetermined position of the cavity 25, shown in FIG. 12, between an upper die 26 and a lower die 27 and Injection molding resin composed of, e.g., polycarbonate and glass fiber contained therein as a reinforcing material is injected through a gate 28 into the cavity 25 so that the discoidal spider part 8b connecting the rotary shaft 7 and the rim part 8a is formed. In this case, a groove or knurl 29 for strengthening the connection between the rotary shaft 7 and the injection molding resin is cut in the peripheral face at the end of the rotary shaft 7 beforehand to rough that face, and a plurality of crosswise holes 30 for introducing the injection molding resin are formed in the peripheral face on one side of the ringlike rim part 8a of rotary yoke 8. Furthermore, a plurality of ribs 8c radially extended and simultaneously used as cooling fan blades are formed on the plate face of the discoidal spider part 8b facing the stator.

FIGS. 10 and 11 show an application of the aforesaid embodiment, wherein the plastic spider 8b incorporates a resin-molded cover part 8d for covering the outer peripheral face of the ringlike rim part 8a through the crosswise holes 30 of the ringlike rim part 8a so as to further strengthen the connection between the ringlike rim part 8a and the discoidal spider part 8b. In this embodiment, there is employed a mold whose upper die 26, as an equivalent to what is shown in FIG. 12 forms a cavity slightly larger than the outer diameter of the ringlike rim part 8a.

Figure 3:
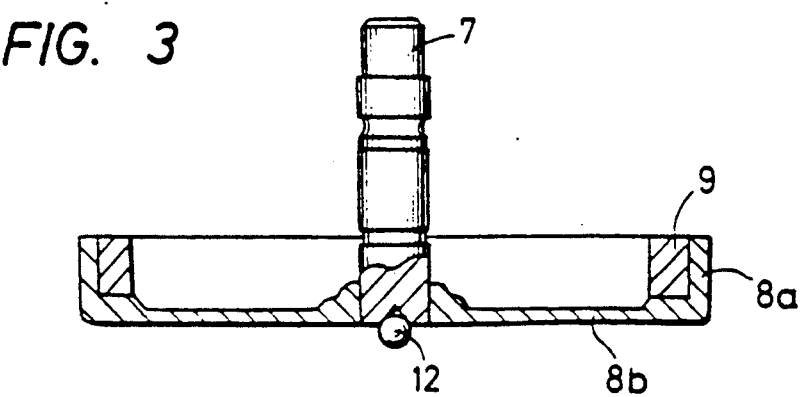
FIG. 3 is a sectional view of the rotor in FIG. 1.

With the aforesaid arrangement, the total weight of the rotor is made lighter than that in the conventional structure shown in FIG. 3 to the extent that the spider is plasticized. Accordingly, the starting characteristics of the motor becomes improvable because the moment of inertia is reduced and noise due to the mechanical vibration generated during operation is also lowered. In addition, the adoption of the integral molding process makes it possible to decrease the number of man-days required for assembling parts into a rotor.

As set forth above, the stator housing according to the present invention, which is designed for use in a miniature motor, and which housing is loaded with the stator to cover the side faces thereof, equipped with the magnetic shielding plate on its face opposite to the stator, and provided with the bearing assembly for supporting the rotary shaft on the inner peripheral side of the boss part in the center of the housing, is constructed by molding resin into the housing body to incorporate the magnetic shielding plate and the bearing assembly. Accordingly, such shrinkage voids causing air leakage as is often the case with a metal housing constructed under the conventional diecast method are prevented and the number of man-days required for assemblying parts into those including the magnetic shielding plate and the bearing assembly, and therefore production costs, can be reduced to a greater extent. Moreover, in view cf reliability and mass production, the stator housing thus obtained and intended for use in a miniature motor is excellent as a driving motor for a fixed magnetic disk unit.

As set forth above, further, the rotor for a miniature motor according to the present invention, wherein the magnet facing the outer peripheral face of the stator is installed on the inner peripheral side of the ringlike yoke made of magnetic material and coupled to the rotary shaft, is supported with the resin-molded discoidal spider incorporating the rotary shaft and the ringlike yoke. Accordingly, the number of man-days, and therefore production costs, can be reduced to a greater extent while greater starting characteristics and reduction in noise are attained. Moreover, in view of reliability and mass production, the stator housing thus obtained and intended for use in a miniature motor is excellent as a driving motor for a fixed magnetic disk unit.

What is claimed is:

1. A method of manufacturing a nonmetallic stator housing for use in a miniature motor having a stator, a magnetic shielding plate integrally formed with said stator housing, a rotary shaft and a ball bearing assembly for supporting said rotary shaft, said bearing assembly having two radial ball bearings each with inner and outer races and arranged in the axial direction of said rotary shaft, and a coil spring compressed and held between said outer races, the method comprising the steps of:

inserting said magnetic shielding plate and said bearing assembly in a predetermined position into a preformed mold cavity;

covering open end faces between said inner and outer races by securing said ball bearing assembly to an insert pin prior to placement of said insert pin in said preformed mold cavity;

sealing an outer periphery of said coil spring with a flexible cover prior to said placement of said pin; and injecting a nonmetallic stator resin into said preformed mold cavity to form said nonmetallic stator housing, wherein said magnetic shielding plate and said bearing assembly are integrally formed with said stator housing.

* * * * *